United States Patent [19]
Vaseloff et al.

[11] Patent Number: 5,186,097
[45] Date of Patent: Feb. 16, 1993

[54] FRYER CONTROLLER

[75] Inventors: Dennis J. Vaseloff, Waukegan; Gary J. Dobrino, River Grove; James A. King, Naperville; Wai Y. Chu, Bloomingdale, all of Ill.

[73] Assignee: Prince Castle, Carol Stream, Ill.

[21] Appl. No.: 855,298

[22] Filed: Mar. 23, 1992

[51] Int. Cl.⁵ .............. A47J 27/00; A47J 37/12; H05B 1/02; G06F 15/20
[52] U.S. Cl. .................. 99/330; 99/332; 99/403; 219/492; 219/494; 219/497; 364/400; 364/557
[58] Field of Search ............... 99/330, 331, 332, 403, 99/407, 409, 426, 325, 327, 328; 219/492, 494, 442, 497; 364/400, 557, 144; 426/438, 441; 126/374, 351

[56] References Cited

U.S. PATENT DOCUMENTS

| | | |
|---|---|---|
| 3,326,692 | 6/1967 | Martino et al. . |
| 3,397,993 | 8/1968 | Strong . |
| 3,979,056 | 9/1976 | Barnes . |
| 4,278,872 | 7/1981 | Koether et al. . |
| 4,282,423 | 8/1981 | Volz .................. 99/330 |
| 4,437,159 | 3/1984 | Waugh . |
| 4,549,527 | 10/1985 | Davis . |
| 4,585,925 | 4/1986 | Andre .................. 99/328 |
| 4,601,004 | 7/1985 | Holt et al. . |
| 4,663,710 | 5/1987 | Waugh et al. . |
| 4,672,540 | 6/1987 | Waugh et al. . |
| 4,682,012 | 7/1987 | Wolf et al. .................. 99/332 |
| 4,740,888 | 4/1988 | Ceste, Sr. et al. . |
| 4,742,455 | 5/1988 | Schreyer . |
| 4,782,215 | 11/1988 | Kadwell et al. ............ 219/494 |
| 4,803,344 | 2/1989 | Wolf et al. .................. 99/330 |
| 4,812,625 | 3/1989 | Ceste, Sr. . |
| 4,858,119 | 8/1989 | Waugh et al. . |
| 4,864,498 | 9/1989 | Pasquini et al. . |
| 4,899,034 | 2/1990 | Kadwell et al. ............ 219/497 |
| 4,920,948 | 5/1990 | Koether et al. ............. 99/330 |
| 4,974,501 | 12/1990 | Grob et al. .................. 99/408 |
| 5,029,244 | 7/1991 | Fowler ...................... 219/492 |
| 5,038,676 | 8/1991 | Davis et al. ................. 99/403 |
| 5,090,305 | 2/1992 | Lehman ...................... 99/330 |

Primary Examiner—Timothy F. Simone
Attorney, Agent, or Firm—Wood, Phillips, VanSanten, Hoffman & Ertel

[57] ABSTRACT

A cooking apparatus disclosed herein includes a vat storing cooking medium for cooking food items placed therein, a heater for heating the cooking medium, and a temperature sensor for sensing cooking medium temperature. A cooking control comprises an interface circuit connected to the heater and the temperature sensor. A programmed processor is connected to the interface circuit for controlling the heater during a cooking cycle in response to sensed temperature in accordance with a programmed algorithm. The algorithm uses a preselected cooking energy profile for a typical batch of a food product to be cooked during the cooking cycle. The profile identifies predetermined times during the cooking cycle at which the heater is turned on or off. The algorithm periodically compares sensed oil temperature to the stored profile and in response to deviations from the stored profile dynamically modifies the cooking energy profile for use during the remainder of the cooking cycle.

14 Claims, 14 Drawing Sheets

FRYER CONTROLLER

FIELD OF THE INVENTION

This invention relates to a controller for a frying apparatus, and more particularly, to a controller which provides uniform energy consumption.

BACKGROUND OF THE INVENTION

A cooking apparatus in one known form includes a vat or fry pot for storing a cooking medium. The medium may be, for example, frying oil or shortening. The cooking medium is heated, such as with a gas burner or electric heating element, to a level suitable for cooking. A food product to be cooked is usually held in a fry basket which can then be lowered manually or automatically into the frying oil. The elevated temperature of the oil cooks the food product, as is well known. A typical such cooking apparatus is used in restaurants. As such, it is desirable to provide uniformity of performance. For example, with a product such as french fries, it is desirable that each batch be cooked virtually identically to maintain consistent satisfaction with customers.

Assuming ideal cooking conditions, a uniform cooking cycle can be provided to maintain uniformity. A typical prior cooking apparatus includes a burner or electric heating element controlled by a thermostatic control to maintain generally uniform temperature of the cooking medium. The cooking cycle is normally controlled to satisfy a preselected period of time. However, each cooking cycle is not necessarily identical. For example, the temperature of the product and its weight affect oil temperature. Deviations from normal expected temperatures result in under or overcooking of the food product. Strong, U.S. Pat. No. 3,397,993, discloses a process for avoiding such problems which is operable to shorten or extend the cooking time period according to deviations in oil temperature.

Most early designs for fryer controllers controlled cooking cycle time to provide uniformity. Because of high energy costs it is also desirable to maintain uniformity in oil temperature. This is difficult to accomplish because of the affects of food product on oil temperature, as discussed above. Moreover, the addition of particulate matter to the oil can also affect the oil temperature. It is desirable to maintain consistent energy usage with each batch.

The disclosed invention is directed to solving one or more of the problems discussed above.

SUMMARY OF THE INVENTION

In accordance with the invention there is disclosed a cooking apparatus which dynamically modifies a cooking energy profile for use during a cooking cycle.

Broadly, there is disclosed herein a cooking apparatus including a vat storing cooking medium for cooking food items placed therein, a heater for heating the cooking medium, and a temperature sensor for sensing cooking medium temperature. A cooking control comprises an interface circuit connected to the heater and the temperature sensor. A programmed processor is connected to the interface circuit for controlling the heater during a cooking cycle in response to sensed temperature in accordance with a programmed algorithm. The algorithm uses a preselected cooking energy profile for a typical batch of a food product to be cooked during the cooking cycle. The profile identifies predetermined times during the cooking cycle at which the heater is turned on or off. The algorithm periodically compares sensed oil temperature to the stored profile and in response to deviations from the stored profile dynamically modifies the cooking energy profile for use during the remainder of the cooking cycle.

It is a feature of the invention that the programmed processor includes a memory means for storing the algorithm and the cooking energy profile.

It is another feature of the invention that the algorithm modifies the cooking energy profile only for use during the current cooking cycle, the preselected cooking energy profile being stored in the memory means for use in subsequent cooking cycles.

It is a further feature of the invention that the algorithm includes a learn mode of operation for cooking a typical batch of food and in response thereto stores time and temperature data for the cooking cycle for storage in the memory means as a preselected cooking energy profile.

There is disclosed in accordance with a further aspect of the invention a cooking control comprising an interface circuit connected to the heater and the temperature sensor. A programmed processor is connected to the interface circuit for controlling the heater during a cooking cycle in response to sensed temperature in accordance with a programmed algorithm. The algorithm uses a preselected cooking energy profile for a typical full batch of a food product to be cooked during the cooking cycle. The profile identifies predetermined times during the cooking cycle at which the heater is turned on and off. The algorithm is operable to determine if a full batch of food product is being cooked during the cooking cycle or if it is a partial batch, and in response to sensing a partial batch, dynamically modifying the cooking energy profile for use during the remainder of the cooking cycle.

Further features and advantages of the invention will readily be apparent from the specification and from the drawings.

DESCRIPTION OF THE INVENTION

Figure 1:
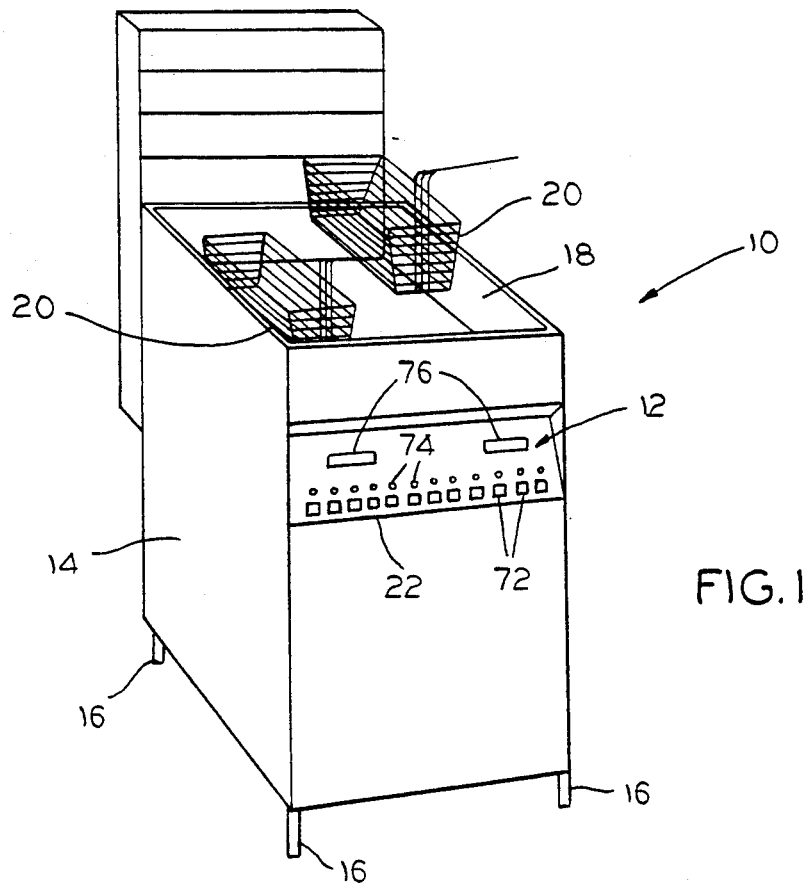
FIG. 1 is a perspective view of a cooking apparatus including the cooking control according to the invention.

Referring to FIG. 1, a cooking apparatus 10 including a control 12 according to the invention is illustrated. In the illustrated embodiment of the invention, the cooking apparatus 10 is operable to cook a food product using a cooking medium, such as oil. However, the control could be used in connection with other cooking apparatus, such as grills or ovens or the like, as will be readily apparent to one skilled in the art.

The cooking apparatus 10 includes a cabinet 14 supported on legs 16. The cabinet 14 houses a vat or fry pot 18 for storing a heated cooking medium. The fry pot 18 is of a size and shape to hold up to two fry baskets 20. Each fry basket 20 can hold a suitable quantity of a food product to be cooked. The food product is cooked as by lowering one or both of the baskets 20 into the fry pot 18. The control 12 includes a control panel 22 as a user interface for controlling operation of a cooking cycle.

Figure 2:
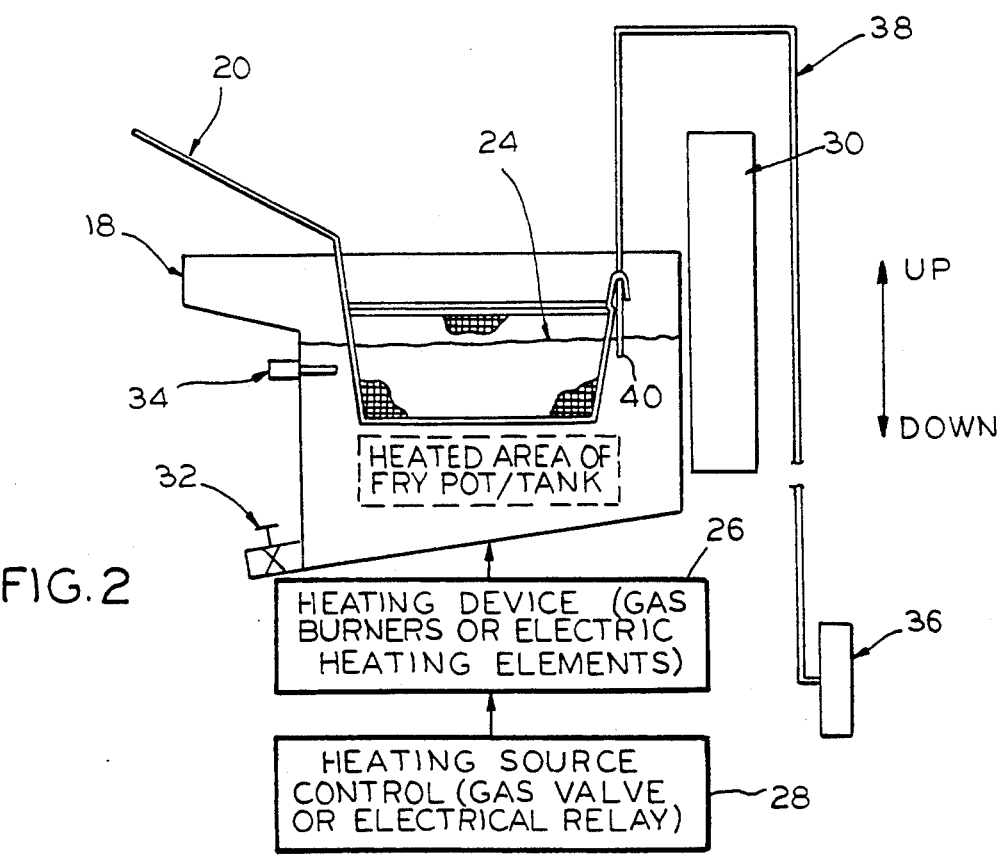
FIG. 2 is a sectional view illustrating in greater detail the components of the apparatus of FIG. 1.

With reference to FIG. 2, the structural components related to cooking are illustrated in greater detail. The fry pot 18 holds a suitable quantity of a cooking medium 24. In a typical application, the cooking medium 24 is a frying oil or shortening filled to a suitable level to cover the food product in the fry basket 20. A heating device, illustrated in block diagram form at 26, is operated by a heating source control 28 for heating the cooking medium 24. The heating device 26 may be either a gas burner or an electric heating element. The heating source control 28 is a gas valve for use with a gas burner heating device or an electrical control relay for use with an electric heating element. A flue 30 is included for exhausting flue gases in applications in which a gas burner 26 is used. A drain pipe and valve assembly 32 is used for draining cooking medium 24 from the fry pot 18.

To control operation of the heating device 26, as well as a more general cooking cycle, an electronic temperature sensor, such as a probe 34, senses temperature of the cooking medium 24. In the illustrated embodiment of the invention, the probe 34 is a thermistor. The probe 34 could also be an RTD sensor. In any cooking cycle, it is desirable to maintain uniformity. To do so, the relationship between when the basket 20 is placed in the cooking medium 24 and the start of the cooking cycle should be implemented uniformly. To satisfy this requirement, a basket lift motor and mechanism 36 of conventional form is included. The basket lift motor and mechanism 36 is operable to raise or lower a basket lift arm 38 secured at a distal end 40 to one of the baskets 20. In fact, two such mechanisms 36 and lift arms 38 are provided, one for each basket 20, so that they can be controlled independently.

Figure 3:
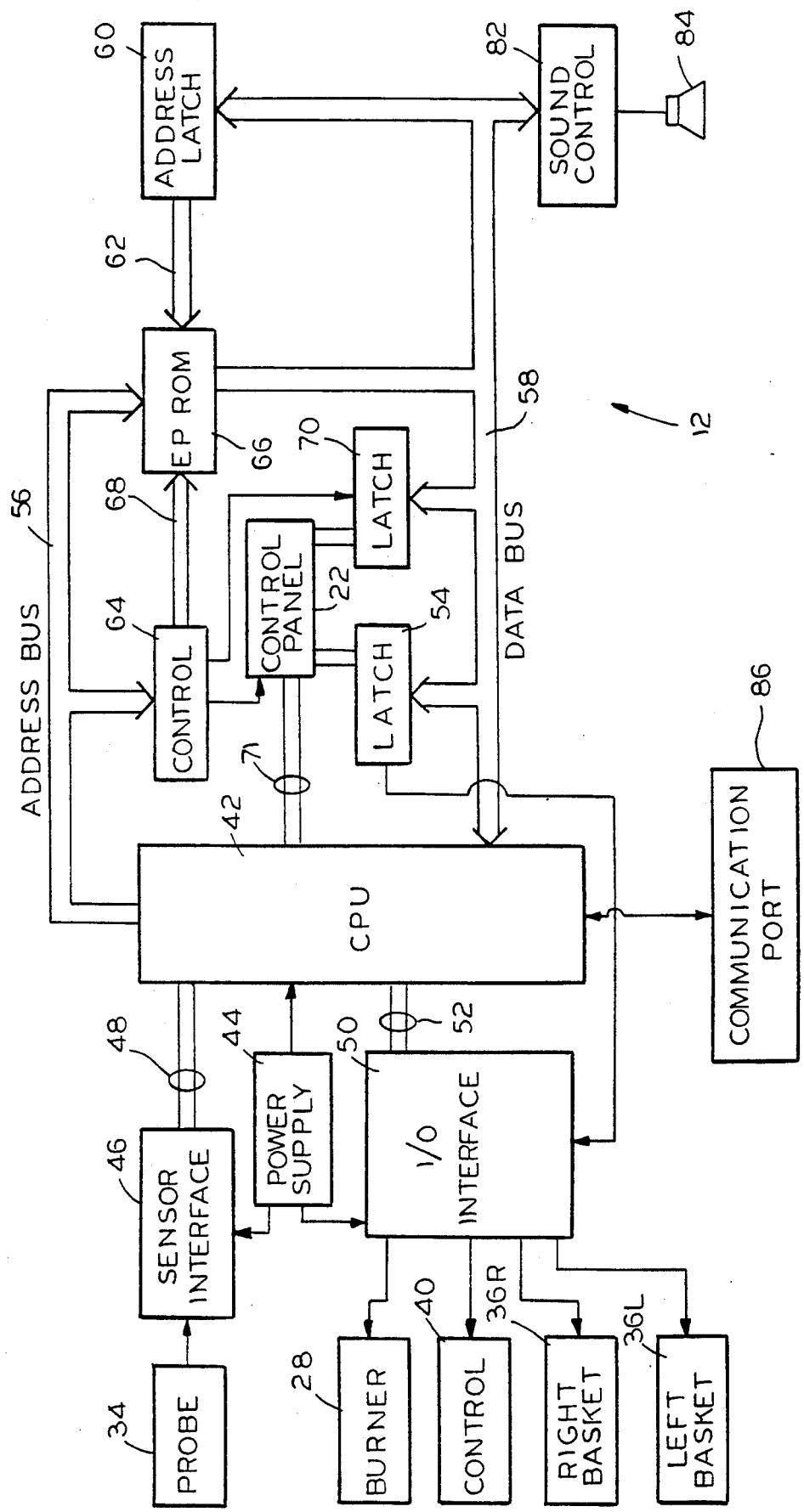
FIG. 3 is a block diagram of the cooking control according to the invention.

With reference to FIG. 3, a block diagram illustrates an implementation for the control 12 of FIG. 1. On the left side of the block diagram are the input and output devices shown in FIG. 2, including the burner control 28 and the probe 34. Two basket lift motor and mechanisms 36 are illustrated, one for the left basket (labeled 36L) and one for the right basket (labeled 36R). In addition, a block 40 is referenced as a control output. This output is used to disable automatic control as by transferring control to an external backup thermostatic type control if a probe or other electronic failure is detected.

The control 12 includes a microcontroller unit (MCU) 42 for implementing all control functions. The MCU 42 is powered by a power supply circuit 44 of conventional construction. The MCU 42 is connected to the probe 34 via a sensor interface circuit 46. The sensor interface circuit 46 includes a voltage to frequency converter for converting voltage sensed by the probe 34 to a frequency signal having a frequency varying responsive to sensed temperature. The use of such a conversion circuit allows changes in temperature to be more readily monitored by the MCU 42. The sensor interface circuit 46 also includes a probe detection circuit comprising comparators for sensing an open probe or shorted probe condition. All of these signals are transferred to the MCU 42 via a plurality of lines 48.

The sensor interface circuit 46 is also powered by the power supply circuit 44.

The burner 28 and the control 40 are connected to the MCU 42 via an I/O interface circuit 50. The I/O interface circuit 50 converts the discrete signals to a level appropriate for the MCU 42. The discrete signals are transferred between the I/O interface 50 and the MCU 42 via a plurality of lines 52. The left and right basket mechanisms 36L and 36R are also connected to the I/O interface circuit 50. However, they are controlled by a latch circuit 54, discussed below.

The MCU 42 may be, for example, a type 68HC11 microcontroller. The MCU 42 includes address ports connected to an address bus 56 and data ports connected to a data bus 58. The data bus 58 is connected to an address latch 60 providing additional addressing on a supplemental address bus 62.

The address bus 56 is connected to a control circuit 64 comprising a generic array of logic for addressing. Both addresses buses 56 and 62 are connected to a memory circuit 66, such as an EPROM, controlled by the control circuit 64 via line 68. The EPROM 66 is in turn connected to the data bus 58, as is conventional for microcontroller systems.

Also connected to the data bus 58 are the latch circuit 54 and an additional latch circuit 70. The latch circuits 54 and 70 are used as an interface with the control panel 22, see FIG. 1.

Figure 4:
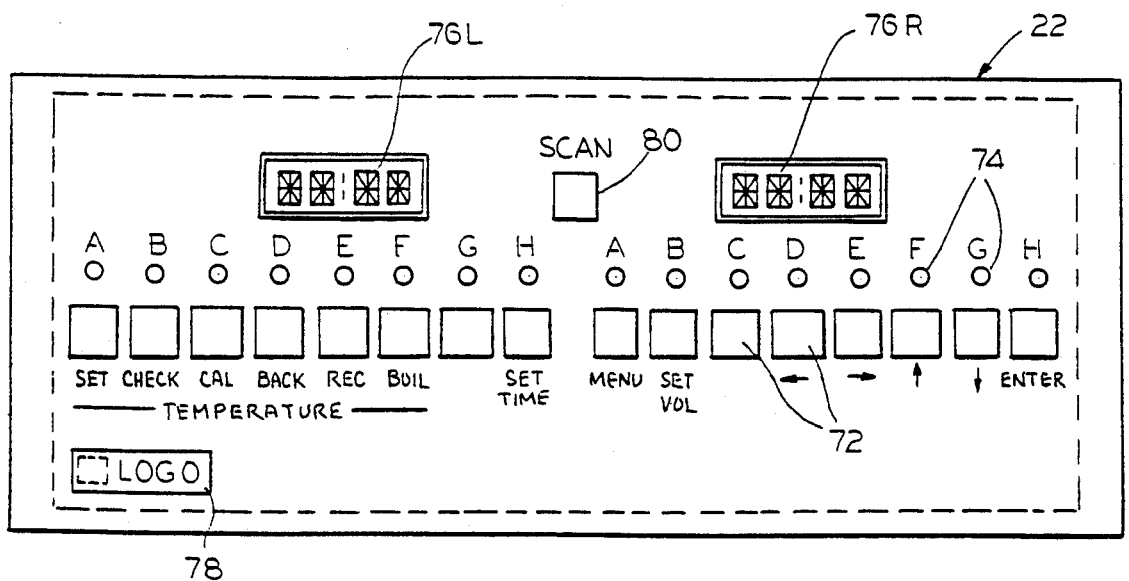
FIG. 4 illustrates a typical template or face plate for a control panel of the control of FIG. 3.

The control panel 22, see FIG. 4, includes push buttons 72 actuating switches, not shown, for commanding operation of the cooking apparatus 10. A plurality of light emitting diodes, or LED's, 74 provide an indication as to which button 72 has been pushed. A pair of four character alphanumeric displays 76 provide status information for cooking with each of the two baskets 20. The first latch circuit 54 multiplexes power to the switches for the buttons 72 as well as controlling the left and right basket controls 36L and 36R, respectively, discussed above. The second latch 70 is used for controlling the displays 76 and LEDs 74. The input from the switches for the buttons 72 is coupled directly to the MCU 42 via lines 71.

Also connected to the data bus 58 is a sound control circuit 82. The sound control circuit 82 includes a synthesizing circuit and amplifier for driving a speaker 84 to provide audio tones and the like to aid in operation of the cooking apparatus 10.

Also connected to the MCU 42 is a communication port 86. The communication port 86 may be a TTL, RS232, RS422 or RS485 type port. The port 86 is used to load all control and timing data as described below, or to extract control, timing or other data from memory, as necessary or desired.

The control 12 operates in accordance with a programmed algorithm. Particularly, the algorithm is stored in the EPROM 66 and includes suitable instructions executed by the MCU 42 for controlling the cooking cycle. With reference also to FIG. 4, the control panel 22 includes a set of eight LEDs 74 labeled A-H for each of the left and right baskets 20L and 20R. A corresponding button 72 is provided for each LED 74. Normally, each button 72 represents a select type of food product to be cooked, and is associated with a cooking program stored in the EPROM 66 for such product. As a result, eight different products can be programmed for each of the left and right baskets. In addition, certain of the buttons have specific programming or other specified functions as indicated by the legends therebelow when pressed simultaneously with a LOGO button 78. The operation of the particular buttons will be described more specifically below in connection with the flow diagram of FIGS. 5A-5F.

The control 12 provides for several modes of operation. A run mode of operation is used while cooking a food product while a normal mode maintains the cooking medium 24 at a temperature suitable for cooking. In these two modes, the temperature of the medium is maintained between set temperatures. For example, the burner may be programmed to turn on when the temperature drops below 345° and to turn off when the temperature exceeds 350°. Another mode comprises an idle mode of operation which is implemented after a preset time period has passed during which no cooking has been performed. The idle mode is generally similar, except that the burner is controlled to maintain a lower temperature on the order of, for example, 250°.

During any cooking cycle the food product is cooked for a select period of time. The time is selected according to the particular food product and is associated with one of the eight buttons 72. The actual cooking time for the particular product does not change. However, to account for variations in oil temperature from that expected, the clocking frequency used for pulsing a counter representing elapsed time is varied to provide a form of time/temperature compensation. This control scheme is well known in the art and is therefore not described in any greater detail herein.

Figure 5A:
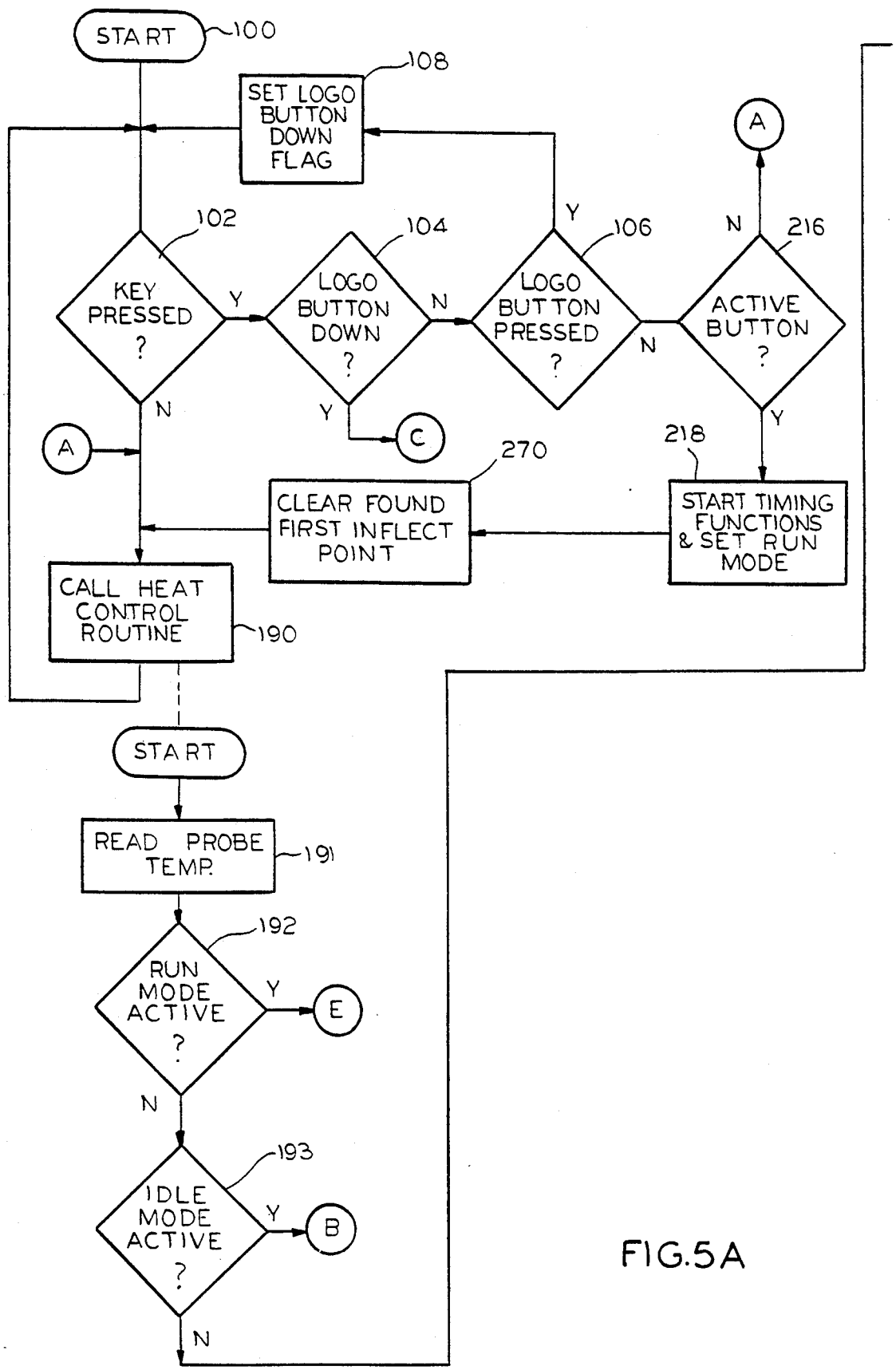
FIGS. 5A-5F comprise flow charts illustrating operation of a control program in the CPU of FIG. 3.
Figures 1, 5A:
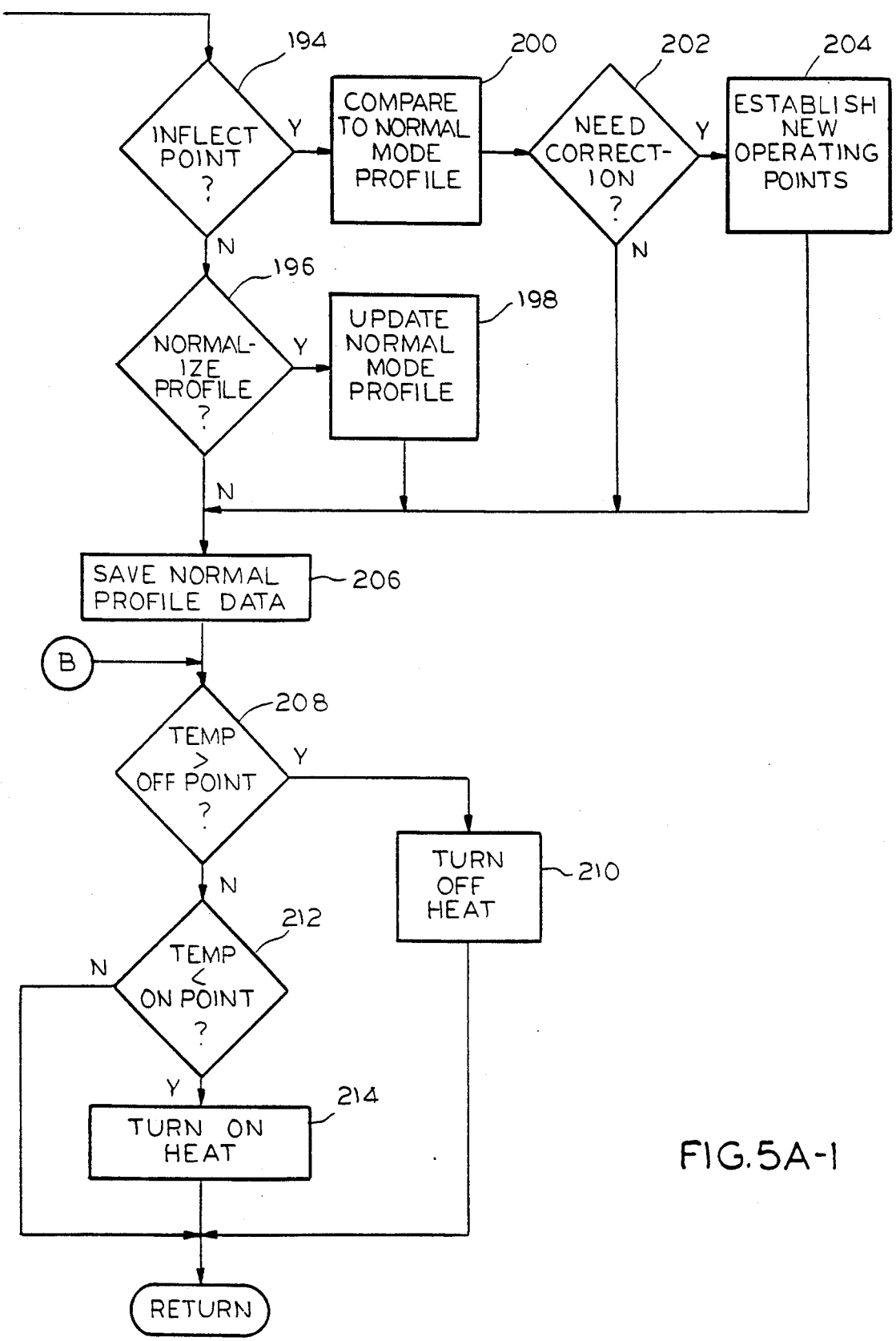

With reference to FIG. 5A, a flow diagram for a main module of the program is illustrated. The main module begins at a start node 100 and advances to a block 102 which determines if any push button has been pressed. Particularly, this decision block determines if any of the sixteen selection buttons 72 or a LOGO button 78 on the control panel 22, see FIG. 4, has been pressed. If so, then a decision block 104 determines if a LOGO button down flag has been set. If not, then a decision block 106 determines if the button pressed is the LOGO button 78. If so, then the LOGO button down flag is set at a block 108 and control returns to the decision block 102. Particularly, the LOGO button 78 is used to implement programming operations. These programming operations are used for selecting user adjustable parameters. To modify any parameter, the LOGO button 78 is held down while a related dedicated button 72 is depressed according to the desired function. There are two levels of programming. The first level includes programming volume level, setting temperature, calibrating temperature, or setting time. Each of these functions are set using a dedicated combination of buttons. A second level of programming relates to features which are not changed very often, namely setting melt cycle time, setting back temperature time and temperature, a cook counter, an Auto Learn function and initiating a self-test operation. During the programming mode of operation, the heat control function is delegated to a background task.

Figure 5B:
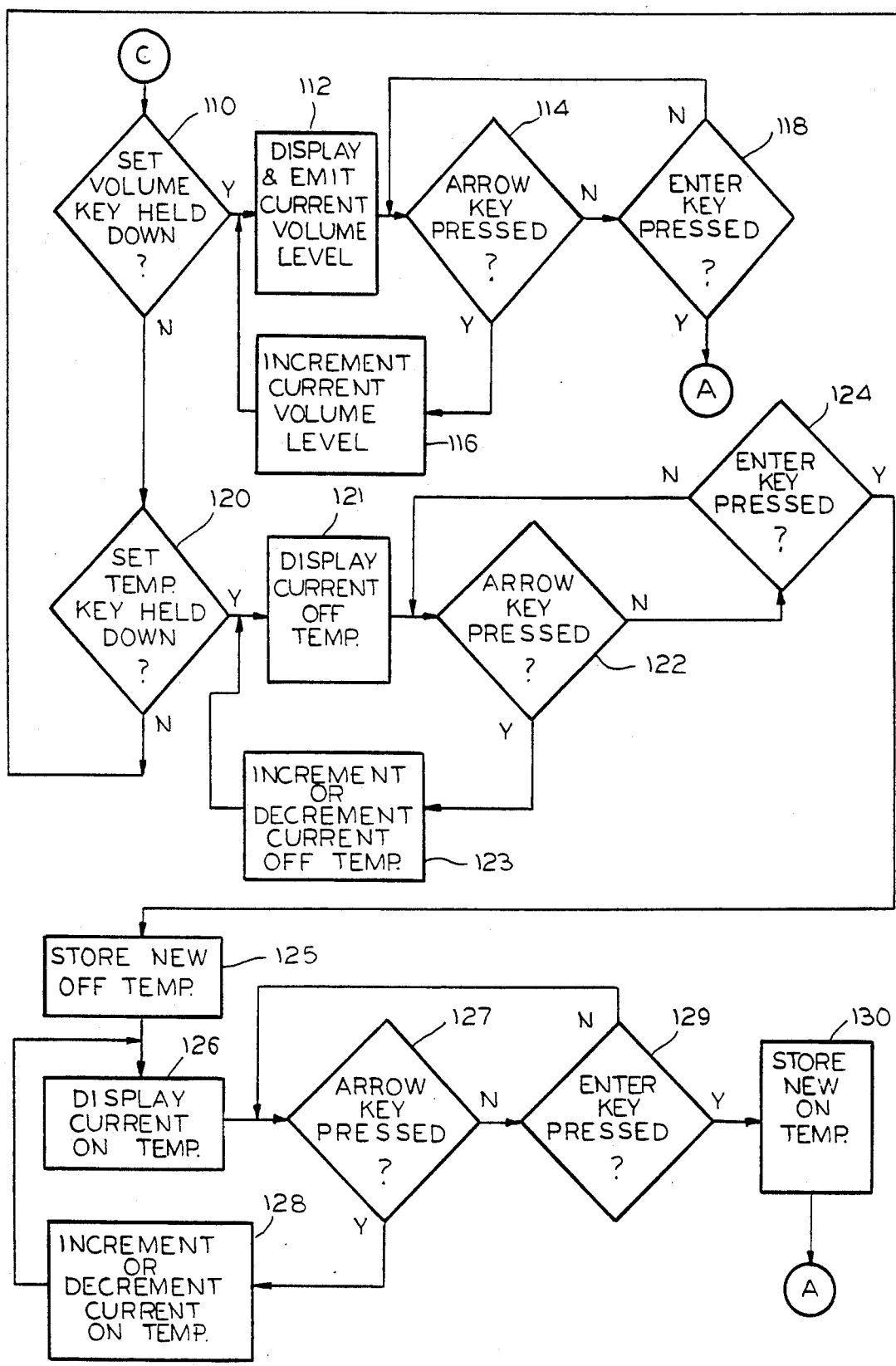
Figures 1, 5B:
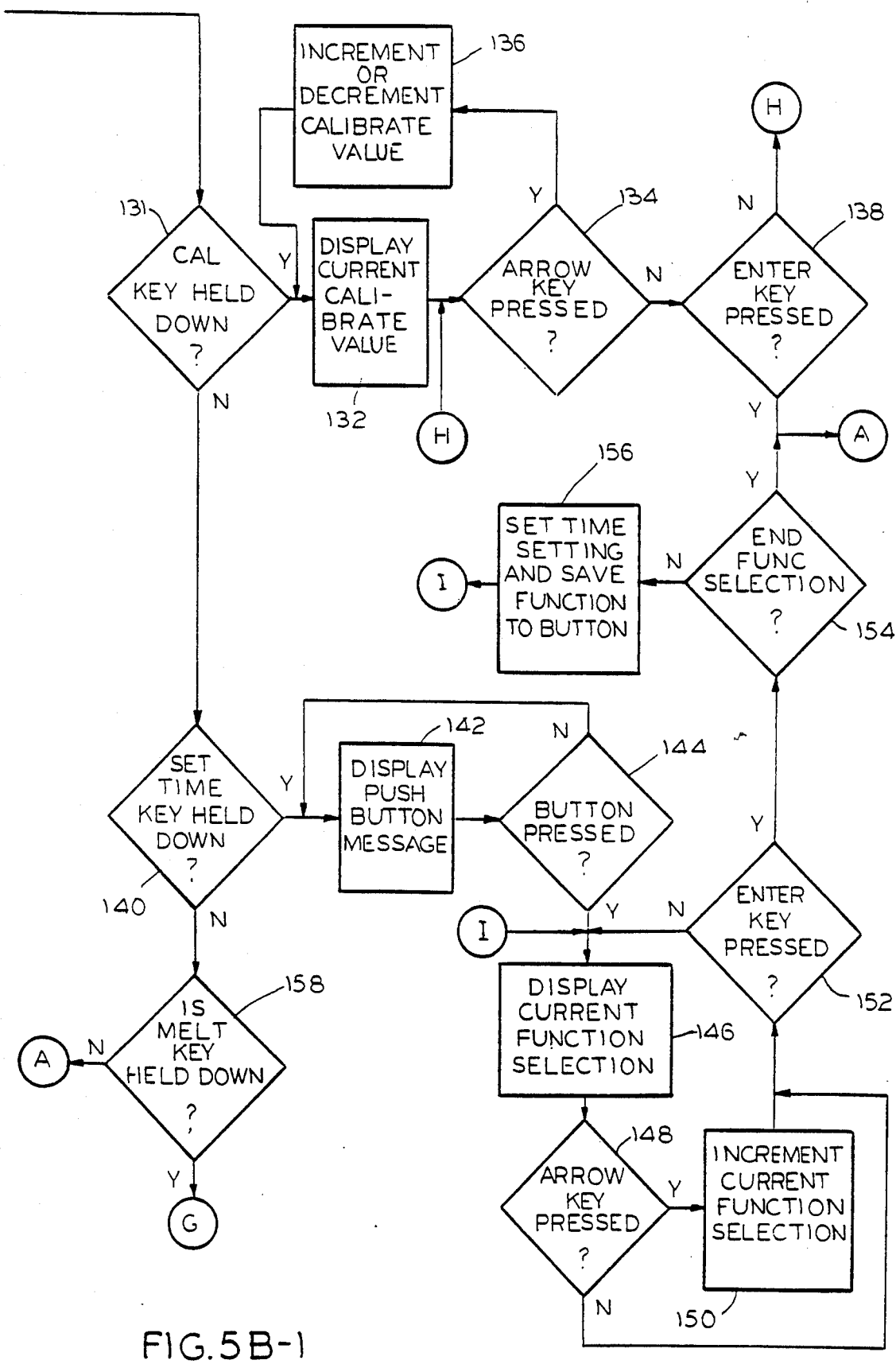
Figure 5C:
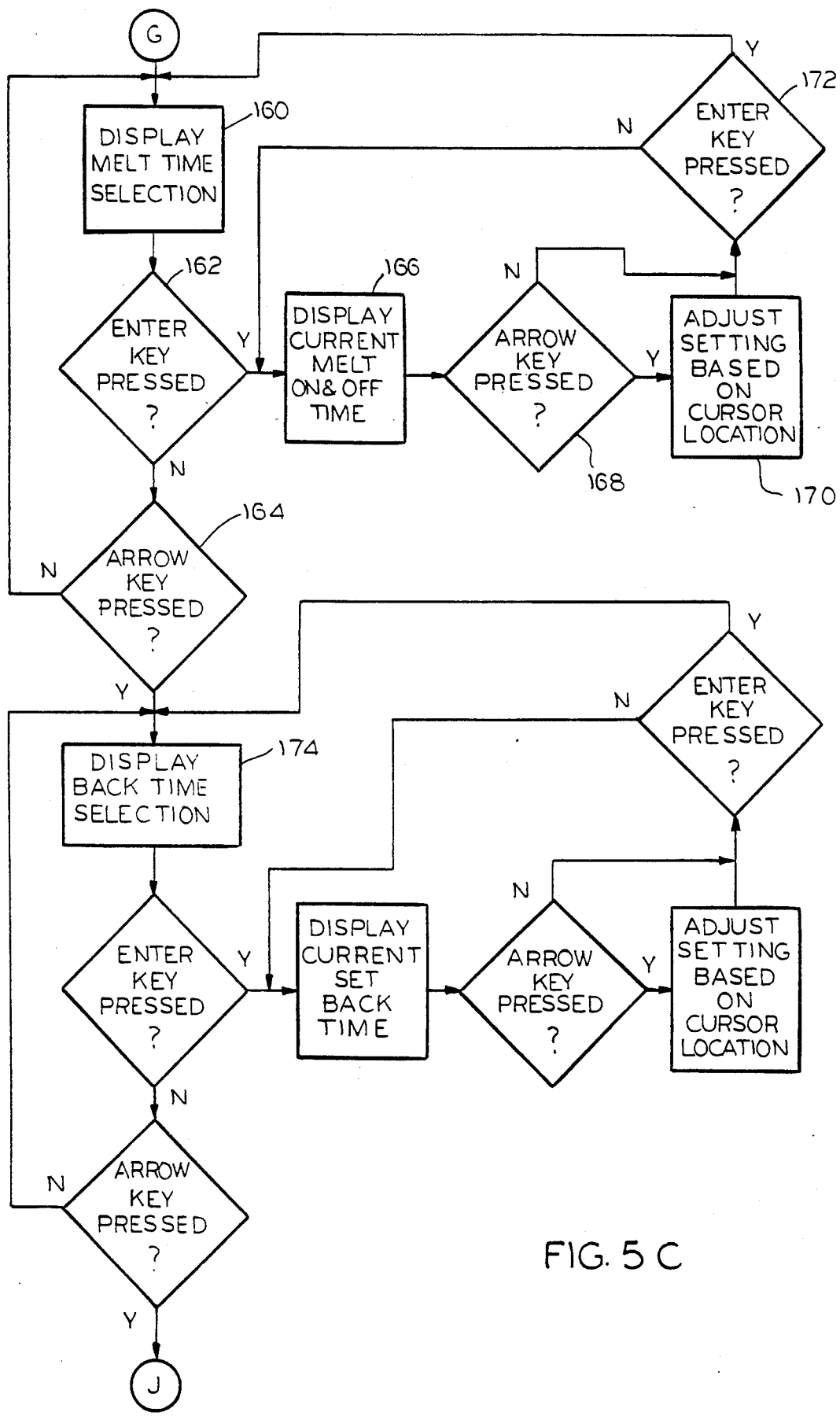
Figures 1, 5C:
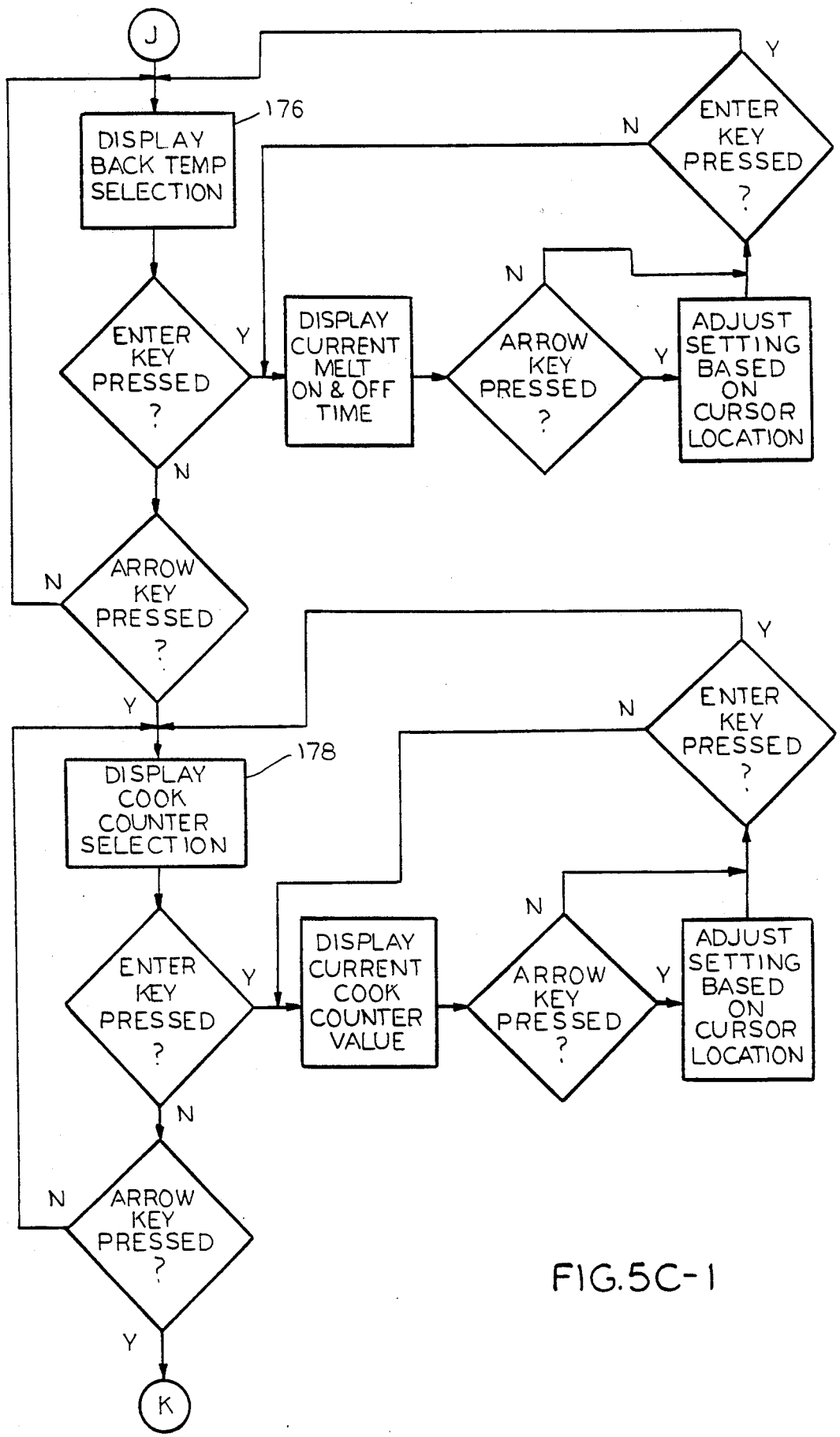

If the LOGO button 78 is pressed and the LOGO button down flag is set, then after returning to the decision block 104 control advances via a node C to a program mode procedure module illustrated by FIG. 5B. This module begins at a decision block 110. The decision block 110 determines if the "SET VOL" function button has been pressed. To change volume level of the speaker 76 the LOGO button 78 and the SET VOL button are depressed for a select period of time. If so, then at a block 112 the current volume level is displayed on the displays 76L and 76R and a tone at the current volume level is generated through the speaker 76. Particularly, the left display 76L displays the characters "VOL=", while the right display 76R displays "V1" with the numeral flashing to indicate the current level. The up and down arrow buttons are depressed to increase or decrease the volume level. A decision block 114 determines if either the up or down arrow button is pressed and, if so, increments or decrements the volume level at a block 116 and then returns to the block 112. If no arrow button is depressed, then a decision block 118 determines if an ENTER button is pressed. If not, then control loops back to the decision block 114. When the ENTER button is depressed the new sound level is entered and saved and control advances via a node A back to the main module of FIG. 5A.

Returning again to FIG. 5B, if the SET VOL button was not held down, as determined at the decision block 110, then a decision block 120 determines if the SET TEMP button is held down. If so, then the current Off temperature is displayed at a block 121. The SET TEMP button is used to program the off temperature, i.e., when the gas valve is turned off, and the on temperature, i.e., when the gas valve is turned on. During this programming cycle, initially the word "OFF" is displayed in the left display 76L and the current temperature in the right display 76R. The up and down buttons are used to vary the temperature and a decision block 122 determines if an arrow button is pressed and if so, increments or decrements the current temperature at a block 123. From there control returns to the block 121. If an arrow button is not pressed, then a decision block 124 determines if the ENTER button is pressed. When the ENTER button is pressed, control advances to a block 125 which stores the OFF temperature. The current ON temperature is displayed at a block 126. During this programming cycle, initially the word "ON" is displayed in the left display 76L and the current temperature in the right display 76R. The up and down buttons are used to vary the temperature and a decision block 127 determines if an arrow button is pressed and if so, increments or decrements the current temperature at a block 128. From there control returns to the block 126. If an arrow button is not pressed, then a decision block 129 determines if the ENTER button is pressed. When the ENTER button is pressed, the ON temperature is saved at a block 130 and control advances to the node A.

If the SET TEMP button was not held down, as determined at the decision block 120, then a decision block 131 determines if the "CAL" button is held down. If so, then the current calibrate value is displayed at a block 132. This feature is used to adjust the temperature displayed when the CHECK temperature button is pressed to the restaurant calibration meter. An offset value is used to control the oil temperature. The value is changed by depressing either the up or down arrow. The decision block 134 determines if an arrow button is pressed and if so, the calibrate value is incremented or decremented at a block 136 and then returned to the block 132. If the arrow button is not pressed, then a decision block 138 determines if the ENTER button is pressed to save the calibration value. If not, then control returns to the decision block 134. If so, then control proceeds to the node A.

If the CAL button is not held down, as determined at the decision block 131, then a decision block 140 determines if a "SET TIME" button is held down. This function is used for setting program values related to the actual cooking cycle time. A generic cooking algorithm is preprogrammed with select counter values being modifiable with the SET TIME routine. The following table illustrates the functions and associated display values for this function:

| Function | Left Display | Right Display | |
|---|---|---|---|
| | | Time | Tune:Cancel |
| Shake | SHAK | 00:30 | T1:AC |
| 2nd Shake | SHK2 | 00:00 | T2:AC |
| Remove | DONE | 02:00 | T3:AC |
| 1st Hold | HLD1 | 00:00 | — |
| 2nd Hold | HOLD | 07:00 | T4:AC |
| Discard | DISC | —:— | T5:AC |
| Button Done | BUTN | DONE | |

Temperature settings could be added to the table to allow for a different frying temperature for each button programmed. Each of the functions can be modified. To determine which of the functions is being modified, the left display includes the indicated characters, while the right display includes the indicated time or tune value. The tune values are used for alarm tune or cancel, the tune representing the particular sound tone generated for the select function.

When the SET TIME button is held down, then at a block 142 a display push button message is displayed. Particularly, the two displays 76L and 76R display the message "PUSH BUTN". This prompts the operator to select a button. The display changes to the first function in the above table (either temperature or shake). The operator then uses the up and down arrow buttons to scroll through the function list. The ENTER button is used to select a function to change. If the ENTER button is depressed, then control advances to a block 146 which displays the current function selection in accordance with the above table. A decision block 148 determines if an arrow button is pressed. If so, then the function is decremented or incremented at a block 150. The right and left arrow buttons move the cursor to modify each of the four characters independently. When the character is on the least significant digit, the right display changes to show the tune:cancel parameter, which are also modified using the arrow button. A decision block 152 then determines if the ENTER button has been depressed. If not, then control returns to the block 146. If so, the a decision block 154 determines if the function selection has ended. If not, then control proceeds to a block 156 which sets the time value and saves the information for the particular button and then control returns to the block 146 so that another parameter can be changed. Once the function selection has ended, as determined at decision block 154, then control advances to the node A, discussed above.

If the SET TIME button is not held down, as discussed relative to the decision block 140, then a decision block 148 determines if the MELT button is held down. If not, then control proceeds to the node A. If so, then the operator has selected special function programming and control advances via a node G to FIG. 5C. The special programming enables the operator to modify parameters all at once that are not frequently changed. These program operations are melt time, back time, back temperature, a cooking counter, Auto Learn, and a self test operation. The up and down arrow buttons scroll through the programming operations and the ENTER button is used to select an option to be changed.

Control begins at a block 160 which displays the melt time selection. A decision block 162 determines if the ENTER button is pressed. If not, then a decision block 164 determines if an arrow button is depressed. If not, then control loops back to the block 160. If the ENTER button is depressed, then the current melt on and off times are displayed at a block 166. Particularly, the gas valve is programmed to cycle on and off until the probe senses a temperature of 250°. The up, down, left and right arrow buttons move the cursor and change values at the cursor location. A decision block 168 determines if an arrow button is depressed. If so, then a setting is adjusted based on the cursor location at a block 170. Thereafter, a decision block 172 determines if an ENTER button is depressed and if not, returns to the block 166. If so, then control returns to the block 160.

From the decision block 164, if an arrow button is pressed, then the back time selection value is displayed at a block 174. Fryer inactivity is timed by the back timer. An alarm will sound and the displays will change to and flash "SET BACK" when the timer reaches zero. This prompts the operator to press and hold the LOGO button 78 and then press the "BACK" button. The fryer temperature is then changed to the back temperature discussed below. An alarm sounds for ten seconds when the back timer reaches zero and at two minute intervals until the fryer is set to the back temperature. The set back alarm is also canceled by pressing a product button. At start up, the back timer will not start until the fryer reaches operating temperature.

The routine for adjusting back time is similar to that discussed above for melt time and is shown in FIG. 5C and is therefore not described in greater detail herein.

After back time selection, the back temperature selection routine begins at a block 176. The back temperature is a lower oil temperature used in the idle mode after the back timer is activated. This value is changed using a routine similar to that for changing the melt time, discussed above.

The next programming function is for the cooking counter at a block 178. The cooking counter keeps track of the number of times the baskets 20 are placed in the oil 24. A number is programmed which is used to sound an alarm and display a message to filter the oil. This value is changed similar to the melt time, discussed above.

Figure 5D:
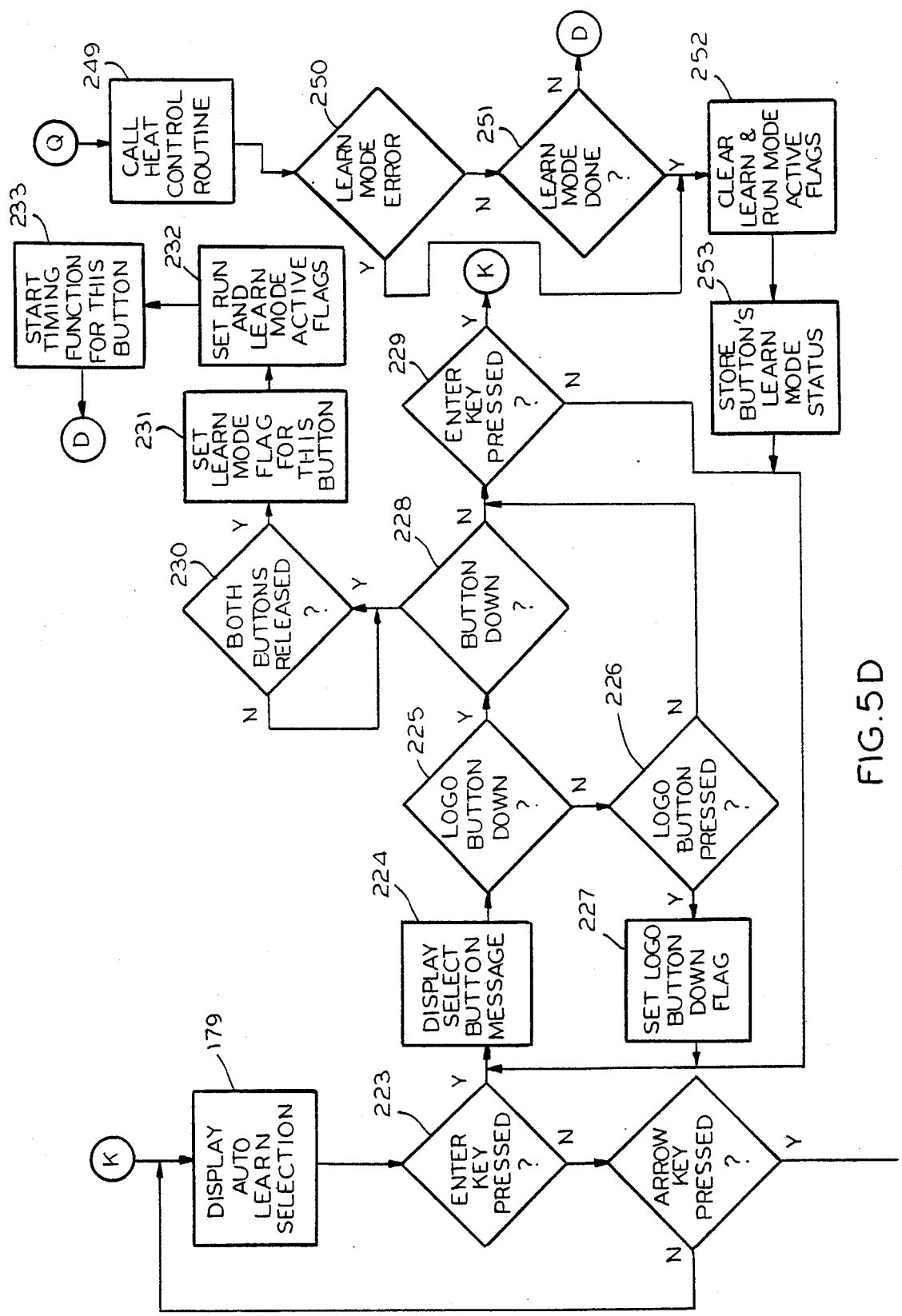
Figures 1, 5D:
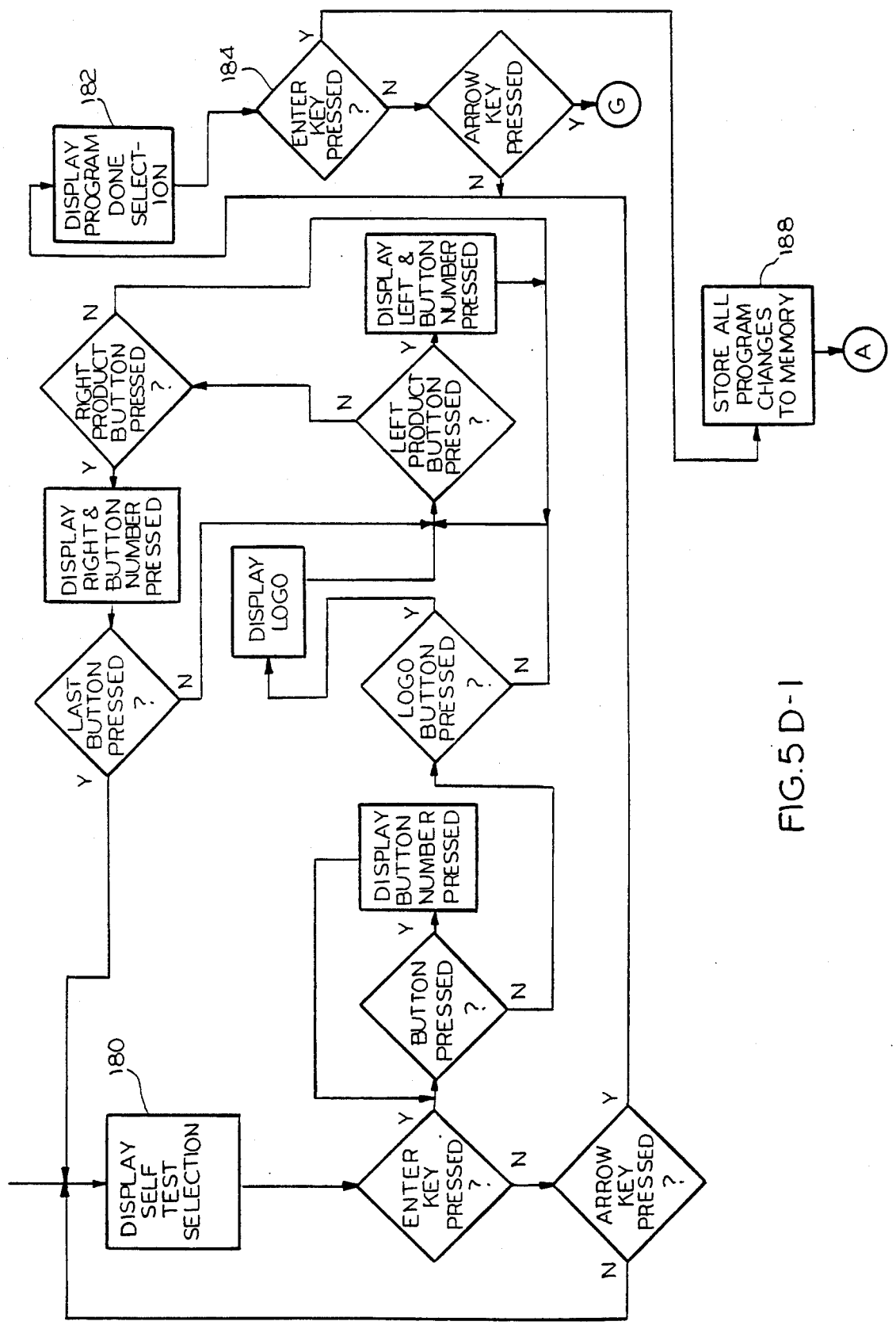

The next select function, via a node K to FIG. 5D, is the Auto Learn program function displayed at a block 179. This function is described below.

The next select function is a self test selection, displayed at a block 180, see FIG. 5D. This is used to test the computer sound, buttons and probe amplifier. The display changes patterns which show the individual character segments. The pattern is followed by displaying the probe temperature for four seconds. This sequence is repeated until self test is stopped.

After self test is stopped, then a program done selection is displayed at a block 182. From there, control can either return to modify any of the values or if the ENTER button is pressed at a decision block 184, then all program changes are stored in memory at a block 188 and control returns to node A.

In the main module of FIG. 5A the node A leads to a block 190 which calls a heat control routine. The heat control routine begins at a block 191 reads the temperature sensed by the probe 34. A decision block 192 then determines if a RUN mode is active. If not a decision block 193 determines if an idle mode is active. If not then control advances to a decision block 194.

In accordance with the invention, it is desirable to minimize overshoot and undershoot during temperature control. A rolling average of temperatures is used to establish control values to maintain a set point temperature. High and low inflection points are compared to a stored normal or idle mode profile so that new operating points are established to maintain proper control. An inflection point is a high or low peak temperature when changing from increasing to decreasing or vice versa. The decision block 194 determines if the temperature is at an inflection point. If not, then at the decision block 196 a decision is made if it is necessary to normalize the profile. Particularly, after a preselected number of cycles it is desirable to update the normalized profile using the running average of sensed temperature. If the profile is to be normalized, then the running profile is updated at a block 198. From the block 198, or if it is not time to normalize the profile at the block 196, then control advances to a block 206, discussed below.

If the sensed temperature is at an inflection point, as is determined at the decision block 194, then the inflection point is compared to the normal mode profile. This looks at both time to reach the inflection point and whether overshoot or undershoot has occurred. A decision block 202 then determines if correction need be made. If not, then control proceeds to the block 206. If so, then new operating points are established at a block 204. The new operating point relates to the ON and OFF temperature values.

The block 206 changes the profile data comprising the time and temperature information discussed above. A decision block 208 then determines if sensed temperature is greater than the OFF point. If so, then the burner 26 is turned off at a block 210. If not, then a decision block 212 determines if temperature is less than the ON point. If so, then the burner 26 is turned on at a block 214. If temperature is not less than the ON point or from either block 210 or 214, then the routine ends.

The routine between the block 208 and the end of the heat control routine is also used to control temperature if the idle mode is active, as determined at the decision block 193.

The RUN mode is activated in order to cook a product as by depressing one of the buttons 72, without pressing the LOGO button 78. As a result, control passes from the decision block 102 to the block 104 and then the block 106. Since the LOGO button is not pressed, then the decision block 216 determines if an active button is pressed. For example, of the eight product buttons, some may be inactive if they are not used for cooking. If an active button is not pressed, then control advances to the node A. If an active button is pressed, then timing functions are started and the RUN mode is set active at a block 218. At a block 220 a found first inflection point flag is cleared and control advances to the block 190 to start the heat control routine.

For the RUN mode, the total of the SHAKE time and SHAKE2 time must be less than the REMOVE time, i.e., the total frying time for a product. The SHAKE times are programmed to time intervals from the start of the frying process. An example of the REMOVE time, the total frying time from start to finish, may be three minutes. The software automatically displays the shortest timer remaining from SHAKE to REMOVE. The following is a programming sequence for illustration purposes:

| | | |
|---|---|---|
| SHAK | 00:35 | SHAK will be displayed 35 seconds after start |
| SHK2 | 01:35 | SHK2 will be displayed 1:35 after SHAK |
| DONE | 03:00 | Total frying 3 minutes. |
| HLD1 | 05:00 | HLD1 will be displayed 5:00 after REM |
| HOLD | 03:00 | Total Hold 8 minutes. |

A display associated with the above example is as follows:

| | |
|---|---|
| 00:01 | Counting towards end of SHAK timer |
| SHAK | Display flashes SHAK and alarm sounds for 5 seconds |
| 01:30 | Time remaining for SHK2 time at end of SHAK alarm |
| . | ... continue the count down SHK2 time |
| 00:01 | Counting towards end of SHK2 timer |
| SHK2 | Display flashes SHK2 and alarm sounds for 5 seconds |
| 00:45 | Time remaining for DONE time at end of SHK2 alarm |
| . | ... continue the count down DONE time |
| 00:01 | Counting towards end of DONE timer |
| DONE | Display flashes DONE and alarm sounds for 5 seconds |
| 04:55 | Time remaining for HLD1 time at end of alarm |
| . | ... Continue the count down HLD1 time |
| 00:01 | Counting towards end of HLD1 timer |
| HLD1 | Display flashes HLD1 and alarm sounds for 5 seconds |
| 02:55 | Time remaining for HOLD time at end of alarm |
| . | ... continue the count down HOLD time |
| 00:01 | Counting towards end of HOLD timer |
| DISC | Display flashes DISC and alarm sounds for 5 seconds |
| — — | No timer is active |

Although the flow diagrams do not illustrate the timing functions for the RUN mode, the following describes the programmed implementation. When a button is pressed to start a timer, the LED 74 above the pressed button 72 is turned on. The "lower" basket lift relay is turned on. The display functions and alarm sounds are displayed as described immediately above in the example. The basket is raised at the end of the REMOVE time. The HOLD timers for the product are then automatically started. The indicator above the product flashes to show the HOLD timer is active and the display shows the HOLD time.

Figure 5E:
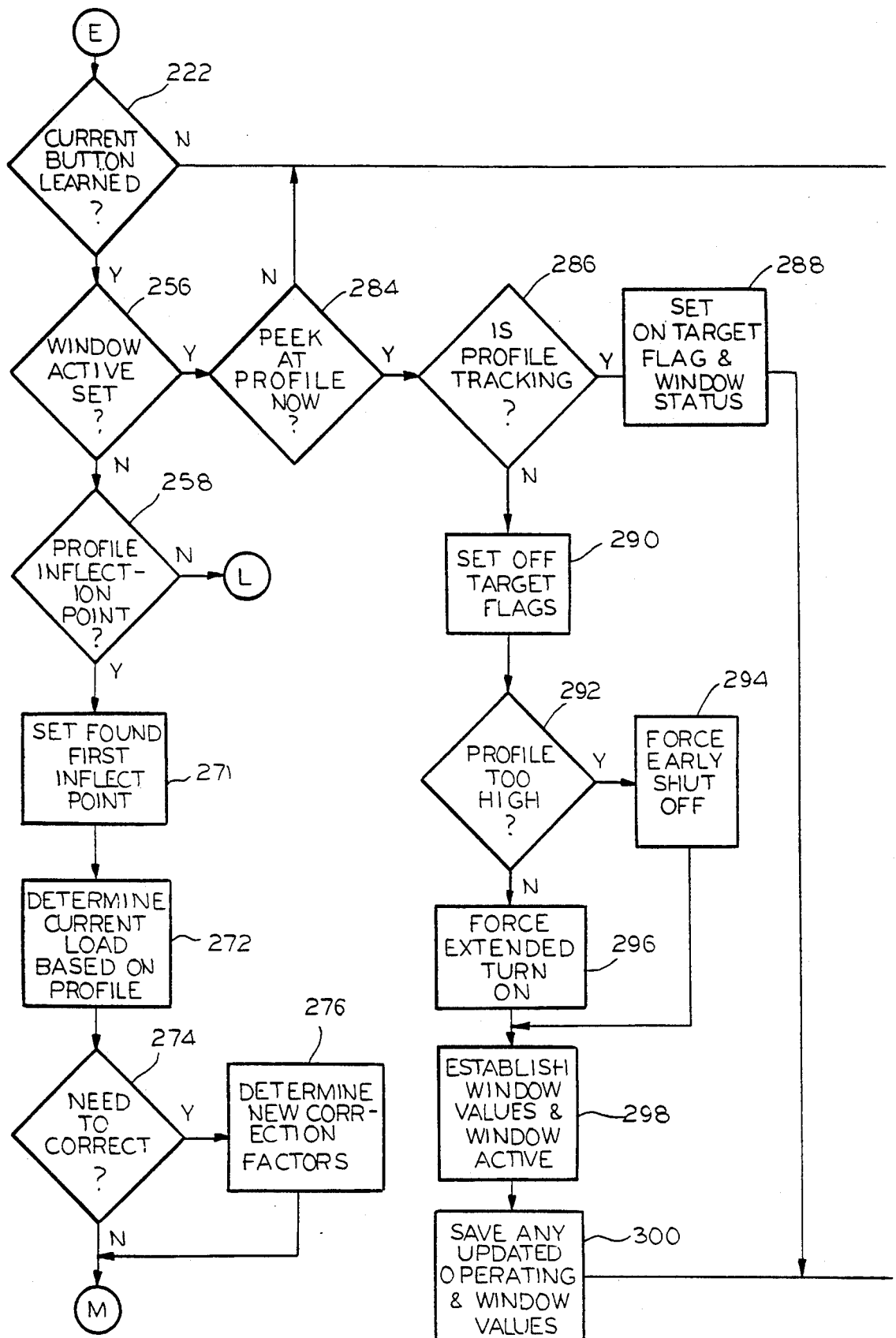
Figures 1, 5E:
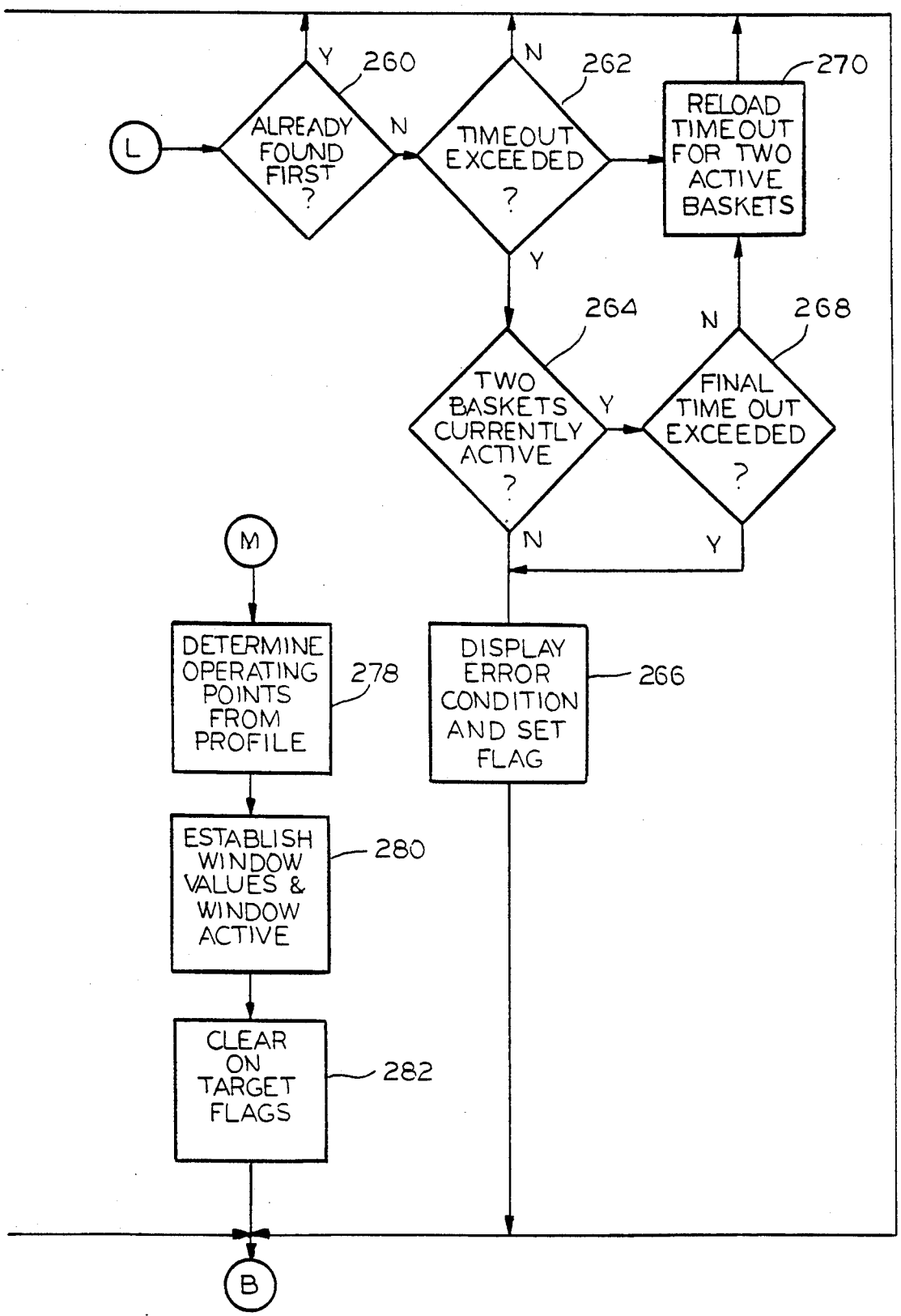
Figure 5F:
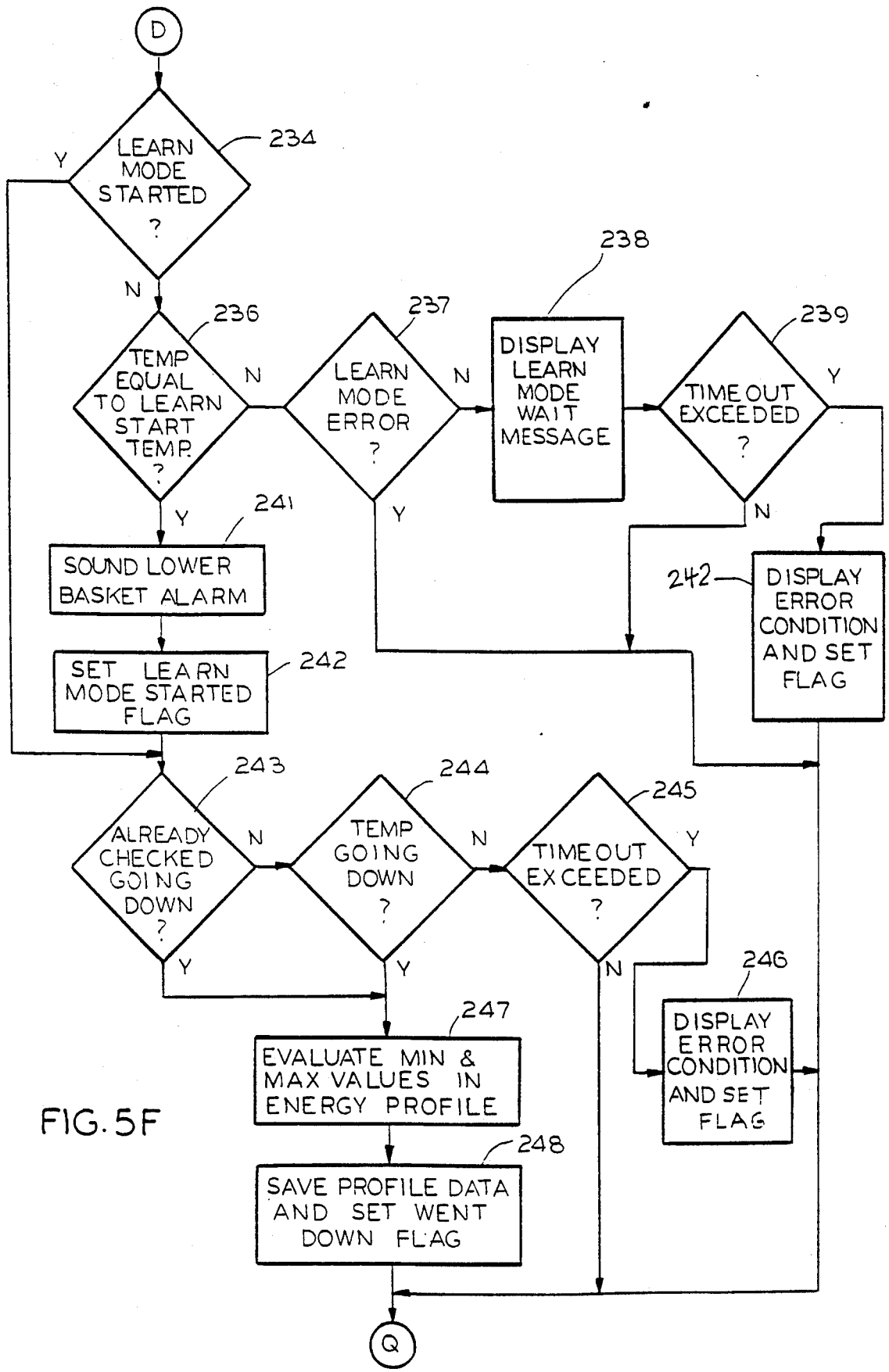

If the RUN mode is active, as determined at the decision block 192, then control advances via a node E to FIG. 5E. A decision block 222 determines if the current button is learned and if not advances to the node B, see FIG. 5A.

Various factors influence operation of any cooking cycle. These include the fact that the temperature of the product and its weight affect oil temperature over time. The oil temperature drops at the beginning of the cooking cycle. The burner 26 is turned on to bring the temperature back to the controlling temperature. The significant energy consumption relates to bringing the temperature back to the controlling temperature and is absorbed by the product being fried. Also, two baskets 20 can be in the cooking medium 24 at different times and each basket 20 can have any one of eight different products. Finally, the oil temperature at the end of the cooking time will respond differently for the different product combinations.

In accordance with the invention, an additional RUN mode referred to as AUTO LEARN mode is used. The AUTO LEARN mode profiles energy required to cook a product. The profile identifies cooking oil temperature at specified times in a cooking cycle. An energy profile is stored in memory.

The two baskets 20L and 20R can be in the cooking medium 24 at different times with the control summing the different energy profiles relative to their time in the frying cycle. The energy profile summation along with the actual temperature controls the gas valve 26 to minimize temperature overshoot at the end of the frying cycle. This reduces energy cost.

In order to AUTO LEARN any button, from the decision block 179, see FIG. 5D, a decision block 223 determines if the ENTER button is pressed. A block 224 displays a message to select a button to be learned. A decision block 225 determines if the logo button down flag is set. If not, then a decision block 226 determines if the logo button is pressed and if so then the logo button down flag is set at a block 227 and control returns to the block 224. If the logo button down flag is set, as determined at the decision block 225, then a decision block 228 determines if a product button to be learned is pressed. If not then a decision block 229 determines if the ENTER button is pressed. If not, then control returns to the block 224. If so, then control returns to the block 179 for another function selection.

From the decision block 228, if both buttons are pressed, then a decision block 230 waits for both buttons to be released. A set learn mode flag for the button is set at a block 231. A block 232 then sets the run and learn mode flags active. The timing functions for the button are started at a block 233 and control advances to a node D, see FIG. 5F.

A decision block 234 determines if the learn mode is started. If not, then a decision block 236 determines if the temperature is equal to a preselect learn start temperature. Advantageously, the current temperature should be as close as possible to the gas valve off temperature. If not, then a decision block 237 determines if there is a learn mode error. This may be an excessive high or low temperature from which the AUTO LEARN could not be implemented. If so, then the routine ends and control advances to a node Q, see FIG. 5D. If there is no learn mode error, then a learn mode wait message is displayed at a block 238 and a decision block 239 determines if a time out value is exceeded. If not, then control returns to the node Q. If so, then an error condition is displayed and an error flag set at a block 240 and control advances to the node Q.

Once the temperature is equal to the learn start temperature, as determined at the decision block 236, then a "lower" basket alarm is sounded at a block 241 and the basket is lowered. The basket 20 should have a full batch of the product to be cooked. The learn mode started flag is then set at a block 242 so that the above routine is thereafter ignored. A decision block 243 determines if a down flag is set and if not, a decision block 244 determines if the temperature is going down. Normally, once the basket 20 is lowered, then the temperature will immediately drop. If not, then a decision block 245 determines if a time out is exceeded. If not, then control advances to the node Q. If so, then an error condition is displayed and flag set at a block 246 and control proceeds to the node Q. If the temperature is going down as determined at the decision block 244 or the checked going down flag is set as determined at the decision block 244, then the minimum and maximum values in the energy profile are evaluated at a block 247. Particularly, and with reference to FIG. 6, a curve illustrates temperature during a cooking cycle. The points labeled "M" are maximum or high temperature inflection points, while the points labeled "L" are minimum or low temperature inflection points. The profile data illustrated by the curve is stored at a block 248 until the cooking cycle is completed and a went down flag is set.

From the node Q, see FIG. 5D, the heat control routine is called at a block 249. A decision block 250 determines if there is a learn mode error. If not, then a decision block 251 determines if the learn mode is done, i.e., the cooking time has finished. If not, then control advances to the node D, see FIG. F. If the learn mode is done or there is a learn mode error, then the learn and run mode active flags are cleared at a block 252. The button's learn mode status is set at a block 253 and control returns to the block 224.

The stored energy profile identifies predetermined times during the cooking cycle at which the burner 26 is turned on or off. Thereafter, when an AUTO LEARN product is being cooked, then the control strives to duplicate the energy profile to avoid overshooting and undershooting of temperature to conserve energy as well as provide uniformity in cooking.

To implement the AUTO LEARN mode, if the current button is learned, as determined at decision block 222, see FIG. 5E, then a product cycle procedure module is implemented.

Figure 6:
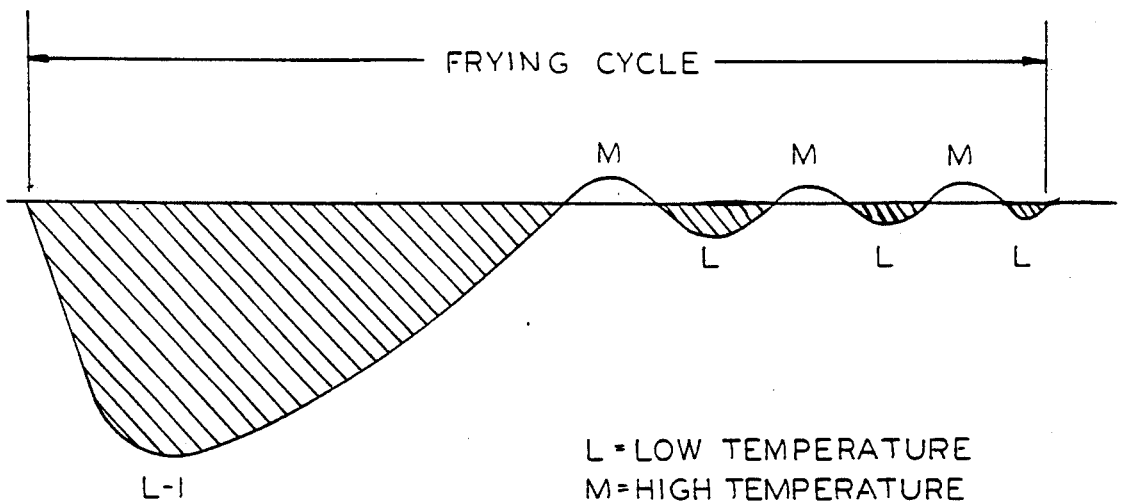
FIG. 6 is a graph illustrating operation of the cooking control in performing an auto-learn operation.

In the AUTO LEARN cooking mode, when a product button is pressed, the control monitors temperature for the first inflection point L-1, see FIG. 6. A partial load will have an inflection point earlier than the stored energy profile inflection point. A full load and with particulate matter in the oil will have an inflection point later than the stored energy profile inflection point. If the actual inflection point occurs before or after the stored value, then the algorithm calculates how long the gas valve should stay on to minimize overshoot of the set point temperature. It also calculates a window of error around the turnoff point. A plurality of "snapshots" can be taken in the window. The first occurs before the calculated off time. This snapshot checks if the temperature is higher than the calculated temperature. If the sensed temperature is greater than the off temperature, then the valve is turned off, a correction factor is calculated and the remaining snapshots are calculated. Otherwise, the valve is left on and a subsequent snapshot is taken. After the last snapshot, if the temperature is proximate the off temperature, then the valve is turned off, and a correction factor is calculated. If the off temperature is higher than the snapshot temperature, then a new off temperature is calculated, a new window is calculated and the system is set up to take the next snapshot in the new window, leaving the valve on. The three step sequence is repeated in the new window.

The time to a maximum inflection point is calculated after the valve is turned off. A window of error is also calculated to check for the inflection point. An error point associated with the valve turn off window is modified by the magnitude of error between the maximum inflection point and the set point temperature. A new valve on temperature is calculated. The sequence of minimum inflection, calculated valve off, maximum inflection point is repeated through the frying cycle. The error factors are stored at the end of the frying cycle and can be used and modified when the button is pressed again.

The implementation of this algorithm is illustrated in FIG. 5E, beginning at a block 256, which determines if a window active flag has been set. At the beginning of the cooking cycle it will not have been set and control proceeds to a decision block 258. The decision block 258 determines if a profile inflection point has been measured. If not, the control advances via a node L to a decision block 260 which determines if the first inflection point was already found. If so, then control advances to the node B. If not, then a decision block 262 determines if a time out value has been exceeded This time out represents a time period during which an inflection point should be reached. If not, then control advances to the node B. If a time out value is exceeded, then a decision block 264 determines if two baskets are currently active, requiring a higher time out value. If two baskets are not active, then an error condition is displayed and a flag set at a block 266 and control advances to node B. If two baskets are active, then a decision block 268 determines if a final time out value is exceeded If so, then control proceeds to the block 266. If not, then at a block 270 a time out value for two active baskets is loaded and control proceeds to the node B.

Returning to the decision block 258, if a profile inflection point is measured, then a found first inflection point flag is set at a block 271 and the current load based on the profile is determined at a block 272. Particularly, the program compares the deviation in time from the expected inflection point to determine loading. If the sensed load matches that in the profile, then a full load is presumed to be in the basket and the normal cooking cycle allowed to continue. A decision block 274 determines if there is a need to correct and if not, proceeds to a node M. If so, then new correction factors are determined at a block 276. These new correction factors relate to either the remaining on time for the valve to minimize overshoot, or revised control temperature values also to minimize temperature overshoot.

From the node M, control advances to a block 278 which determines operating points from the profile relating to subsequent valve on and off times. A block 280 establishes window values and sets a window active flag. The window relates to a time period subsequent to the inflection point at which the temperature conditions should again be evaluated. On target flags are cleared at a block 282 and control advances to the node B. Subsequent to the window being open, when control proceeds to the decision block 256, the window active flag will be set. A decision block 284 determines if sufficient time has passed to open the window. If not, then control advances to the node B. If so, then a decision block 286 determines if the sensed energy profile is tracking the current energy profile. This compares time and temperature based on the prediction of time and temperature according to loading as discussed above. If the profile is tracking, then an on target flag is set and the window active flag is reset at a block 288. Control then advances to the node B.

If the profile is not tracking, as determined at the decision block 286, then an off target flag is set at a block 290. A decision block 292 determines if the profile is too high. If so, then the gas valve 26 is shut off at a block 294. If not, then the ON time is extended at a block 296. From either block 294 or 296, a subsequent window value is established and the window active flag is set at a block 298. The updated operating and window values are saved at a block 300 and control then advances to the node B.

Thus, when a product button is depressed for an AUTO LEARNed product, the burner 26 is controlled so that the sensed energy profile tracks the stored energy profile then controls the valve to minimize overshoot and undershoot. Particularly, the stored profile identifies predetermined times during the cooking cycle at which the burner 26 is turned on or off. The control algorithm periodically compares sensed oil temperature at given times to the stored profile and in response to deviations from the stored profile dynamically modifies the predetermined on and off times for use during the remainder of the cooking cycle.

Assuming a single basket 20 is in the oil 24, the control sequence described above is being implemented. If another basket is placed into the oil, then the product cycle procedure must be modified to account for the second basket. To do so, the error factors and their modifications for the first basket are stored and new inflection points caused by both baskets must be calculated by summing the two current energy profiles. The error factor is then associated with the basket which most influences the temperature.

Thus, in accordance with the invention, the burner control algorithm is dynamically updated based on a calculated value of predicted turn on and off times and temperatures rather than being compared simply to the stored energy profile.

The disclosed embodiment of the invention is illustrative of the broad inventive concepts comprehended hereby.

We claim:

1. In a cooking apparatus including a vat storing a cooking medium for cooking food items placed therein, a heater for heating the cooking medium, and a temperature sensor for sensing cooking medium temperature, a cooking control comprising:
an interface circuit connected to said heater and said temperature sensor;
a programmed controller connected to said interface circuit for controlling said heater during a cooking cycle in response to sensed temperature in accordance with a programmed algorithm, said algorithm using a preselected cooking energy profile for a typical batch of a food product to be cooked during the cooking cycle, said profile identifying predetermined on and off times during the cooking cycle at which the heater is turned on or off based on expected temperature, and said algorithm periodically comparing sensed cooking medium temperature to the stored profile and in response to deviations from the stored profile expected temperature dynamically modifying the on and off times for use during the remainder of the cooking cycle.

2. The cooking control of claim 1 wherein said programmed controller includes a memory means for storing said algorithm and said cooking energy profile.

3. The cooking control of claim 2 wherein said algorithm modifies the on and off times only for use during the current cooking cycle, the preselected cooking energy profile being stored in said memory means for use in subsequent cooking cycles.

4. The cooking control of claim 2 wherein said algorithm includes a learn mode of operation for cooking a typical batch of food and in response thereto storing time and temperature data for the cooking cycle for storage in said memory means as the preselected cooking energy profile.

5. The cooking control of claim 1 wherein said cooking algorithm also periodically compares sensed temperature to preselected on and off temperatures and also turns said heater on in response to sensed temperature being below the preselected on temperature and off in response to sensed temperature being above the preselected off temperature.

6. The cooking control of claim 5 further comprising means for selecting if said cooking energy profile is used during the cooking cycle.

7. In a cooking apparatus including a vat storing a cooking medium for cooking food items placed therein, a heater for heating the cooking medium, and a temperature sensor for sensing cooking medium temperature, a cooking control comprising:
    an interface circuit connected to said heater and said temperature sensor;
    a programmed controller connected to said interface circuit for controlling said heater during a cooking cycle in response to sensed temperature in accordance with a programmed algorithm, said algorithm using a preselected cooking energy profile for a typical full batch of a food product to be cooked during the cooking cycle, said profile identifying predetermined on and off times during the cooking cycle at which the heater is turned on or off based on expected temperature, and said algorithm determining if a full batch of the food product is being cooked during the cooking cycle or if a partial batch of the food product is being cooked and in response to sensing a partial batch, dynamically modifying the on and off times for use during the remainder of the cooking cycle.

8. The cooking control of claim 7 wherein said programmed controller includes a memory means for storing said algorithm and said cooking energy profile.

9. The cooking control of claim 8 wherein said algorithm modifies the on and off times only for use during the current cooking cycle, the preselected cooking energy profile being stored in said memory means for use in subsequent cooking cycles.

10. The cooking control of claim 8 wherein said algorithm includes a learn mode of operation for cooking a typical batch of food and in response thereto storing time and temperature data for the cooking cycle for storage in said memory means as the preselected cooking energy profile.

11. The cooking control of claim 7 wherein said cooking algorithm also periodically compares sensed temperature to preselected on and off temperatures and also turns said heater on in response to sensed temperature being below the preselected on temperature and off in response to sensed temperature being above the preselected off temperature.

12. The cooking control of claim 11 further comprising means for selecting if said cooking energy profile is used during the cooking cycle.

13. The cooking control of claim 7 further comprising means for determining said cooking energy profile, comprising running a product cooking cycle and storing data relating to time and temperature relationships and times during the cooking cycle where the heater is turned on or off.

14. The cooking control of claim 7 wherein after said algorithm determines if a full batch of the food product is being cooked during the cooking cycle or if a partial batch of the food product is being cooked periodically compares sensed temperature to expected temperature and further dynamically modifies the on and off times for use during the remainder of the cooking cycle in response to deviations in sensed temperature and expected temperature.

* * * * *